United States Patent [19]

Wald

[11] Patent Number: 4,902,869
[45] Date of Patent: Feb. 20, 1990

[54] APPARATUS FOR RESISTANCE WELDING

[75] Inventor: Robert Wald, Bad Sackingen, Fed. Rep. of Germany

[73] Assignee: Heinz Finzer KG, Bad Sackingen, Fed. Rep. of Germany

[21] Appl. No.: 139,722

[22] Filed: Dec. 30, 1987

[30] Foreign Application Priority Data

Dec. 30, 1986 [DE] Fed. Rep. of Germany ....... 3644756

[51] Int. Cl.$^4$ ............................................. B23K 11/00
[52] U.S. Cl. ................................................. 219/86.32
[58] Field of Search ............... 219/86.25, 86.22, 86.32

[56] References Cited

U.S. PATENT DOCUMENTS

| 2,382,711 | 8/1945 | Hagedorn | 219/86.32 |
| 2,401,528 | 6/1946 | Vang | 219/86.32 |
| 2,477,117 | 7/1949 | Cox et al. | 219/86.32 |
| 2,863,986 | 12/1958 | Mecklenborg | 219/86.32 |
| 3,165,618 | 1/1965 | Larkin | 219/86.32 |

FOREIGN PATENT DOCUMENTS 1207031 12/1965 Fed. Rep. of Germany .
3327882 11/1984 Fed. Rep. of Germany .
1227388  4/1986 U.S.S.R. .

OTHER PUBLICATIONS

"Widerstandsschweissen mit Magnetkraft", pp. 1–6.

*Primary Examiner*—Clifford C. Shaw
*Attorney, Agent, or Firm*—Fleit, Jacobson, Cohn, Price, Holman & Stern

[57] ABSTRACT

Apparatus for resistance welding consisting of two electrodes that face one another and are biased toward one another by a spring force. Each electrode is held by an electrode support through which an electro-magnetic force is generated to urge the supports away from each other and augment the bias exerted thereon, by converting the movement of the electrode supports away from one, into movement of the electrodes toward one another.

6 Claims, 2 Drawing Sheets

APPARATUS FOR RESISTANCE WELDING

FIELD OF THE INVENTION

The invention relates to apparatus for resistance welding.

BACKGROUND OF THE INVENTION

Known apparatuses for resistance welding comprise two opposite electrodes that are supported by electrode supporters, in such a way that the electrodes may be moved toward one another. The electrodes are used, at the same time, as components of the circuit to which power is supplied to the electrodes during the welding process; workpieces to be welded, are to be placed between the electrodes, for the performance of the welding process, and contact is established between the electrodes and the workpieces. After applying power and/or after the welding current has started flowing, current flows through the workpieces to be welded and, due to the relatively high resistance, heat is generated that melts the surfaces of the workpieces to be welded and welds them together. During that welding process, a reduction of the dimensions of the workpieces, as measured in the axial direction of the electrodes takes place; this reduction needs to be compensated for in some way, such as, following up with at least one electrode, in order to maintain contact between the electrodes and the workpieces. For that reason, the electrodes may be pre-stressed, in relation to one another, by means of an elastic member, such as a spring. The force of the elastic member provides the "electrode power" to ensure a sufficiently secure position of the workpieces to be welded before welding, as well as, the follow-up of the electrodes during the welding process and the constant contact of electrodes and workpieces.

When workpieces of highly conductive materials, e.g. of little contact plates of pure silver, are welded, it is necessary that the transfer resistance at the location of weld at the beginning of the welding process be maximal, for the performance of a resistance weld. For that reason, the small pure-silver contact plates are designed with pointed mounting, so that they are in contact with the workpiece to which they are to be welded, e.g. to a contact supporter, by way of point contact or line contact, but not by way of surface contact. It is necessary to choose an electrode power that is sufficiently small so that the points of the mounting will not be damaged or penetrate the contact mounting. But, an electrode power which is that small, does not ensure an optimal follow-up of the electrodes.

The electrode supporters usually comprise two generally linear parallel rail connectors each of which supports one of the electrodes on one end is connected with a connection cable on the other end. The rail connectors are mounted in such a way that they may be moved in relation to one another, so that the electrodes held on the rail connectors may be moved toward one another. When a current is applied, the current flows through the rail connectors in opposite directions. The magnetic field that appears in conductors through which the current flows in such anti-parallel directions, generates an electro-magnetic force which moves the rail connectors apart. The electro-magnetic force counteracts or acts against the electrode power, so that the pre-stress of the electrodes in relation to the workpieces to be welded will be reduced when workpieces of highly conductive material are welded, a high current intensity is required to weld them if they are touching by point contact. Due to the high current intensity which, when small pure-silver contact plates are welded, may amount to several thousands of amps, the electro-magnetic force that acts between the rail connectors, increases considerably, so that the electrode power that is generated by the elastic member, will be largely compensated. It is even possible that the electro-magnetic force causes a lift-off of the electrodes from the workpieces to be welded; that makes welding of those workpieces impossible. It is not possible to increase the pre-stress of the electrodes because it may damage the mounting points or push them into the contact supporter. The point contact between, e.g. the small pure-silver contact plates and the contact mounting would, in that case, not exist any longer. Due to the surface contact which would prevail in that case between the components of highly conductive materials to be welded, the formation of a correct welded joint would not be possible.

The invention is based on the problem of creating a device for resistance welding that makes it possible also to weld pressure-sensitive parts or workpieces, and that ensures a sufficient follow-up of electrodes as well as their constant lying against or contact with the workpieces to be welded.

SUMMARY OF THE INVENTION

In accordance with the invention, the aforementioned problem is solved by the novel apparatus for resistance welding as described and claimed herein. By making use of the electro-magnetic force that is generated between the electrode supporters when the welding current is supplied, for increasing electrode bias, the electrode power may be small, due to the elastic member, so that pressure-sensitive workpieces to be welded will not be damaged before the welding process. During the welding process using the inventive apparatus, the electro-magnetic force acts with the electrode bias through a mechanical transforming action and exerts an additional or additive effect, so that the electrodes will automatically follow-up and maintain secure contact with the workpieces to be welded.

The electrode supporters are arranged in a unique way to render it possible to make use of the electro-magnetic force to increase the electrode bias during welding. In one form of the invention, a criss-cross arrangement of the electrode supporters is provided and makes it possible to reverse their movement without any intermediate device, e.g. a gear unit. In another form of the invention, the development of a section of one electrode supporter as a gate ("portal") makes it possible to design the other electrode as a straight bar and, despite that fact, to achieve the criss-cross arrangement of the electrode supporters without their being in each other's way when moving in opposite directions. In still another form, when a c-shaped section is developed, the construction space required is reduced considerably when compared to the gate-like section.

In further developments of the invention, the use of an adjustment means makes it possible to change the electro-magnetic force independently of the intensity of the current, without having to enlarge the apparatus. Such an adjusting means may be, e.g., a device that is capable of modifying the height of the gate or of the c-shaped sector by means of a slide-in unit. By the provision or insertion of a joint between the electrode supporters, the electrode supporters are made to act as levers. In that way, a very efficient, mechanically simple design for the reversal of the movement of the electrode supporters can be achieved. An adjustment or location of the position of the joint on the electrode supporters makes it possible, due to the modification of the lever arm, to adjust the electro-magnetic power independently of the intensity of the current. It is also possible to achieve, in the center of the electrode supporters, a zero position in which the electro-magnetic power does not affect the electrode power. So as to prevent any canting of the electrodes when they move toward one another, the development of a guidance device is very effective. When a guidance device is applied which forces the electrodes to assume an aligned mutual movement, and when the electrodes are hinged on the electrode supporters, a rectilinear movement of the electrodes toward one another is ensured, despite the circular, swinging movement of the electrode supporters.

BRIEF DESCRIPTION OF DRAWING FIGURES

Additional objectives, applications, and advantages of the invention may be clearly seen from the following detailed description of preferred embodiments of the invention, making reference to the attached drawings in which:

FIG. 1b shows a frontal view of the connector rails in accordance with FIG. 1a;

FIG. 2b shows a frontal view of the connector rails in accordance with FIG. 2a.

DETAILED DESCRIPTION OF PREFERRED EMBODIMENTS

Figure 1A:
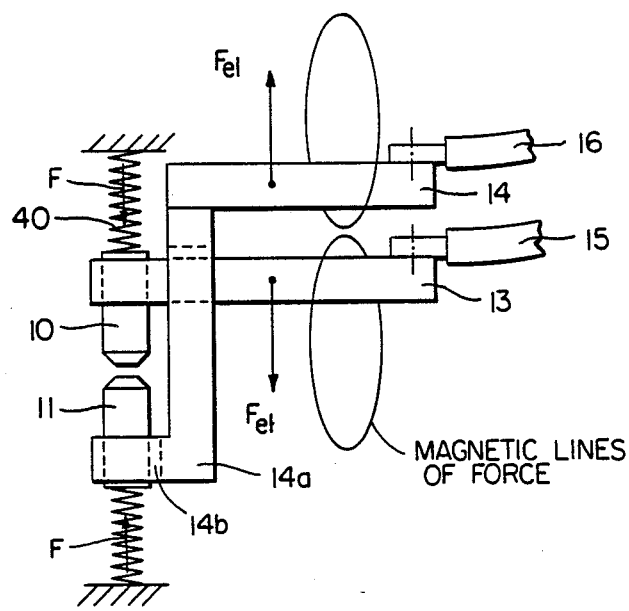
FIG. 1a shows in a lateral view, the design and arrangement of the connector rails in accordance with a first embodiment of the invention.

Apparatus for resistance welding in accordance with the present invention comprises two straight connector rails or bars 13 and 14 which are mounted one on top of the other spaced apart, and one end of each is connected electrically with connecting cables 15 and 16, respectively. The lower connector rail 13 is largely rectilinear and supports in electrical contact, on its other end, an upper electrode 10. The upper connector rail 14 is connected with or formed integrally with a section 14a that runs vertically, and on the lower end of which includes a flange-like projection 14b extending at a right angle. A lower electrode 11 is mounted to face the upper electrode 10, and is held on the flange-like projection 14b. The electrodes 10, 11 are mounted in any suitable wy as is known in the art.

Figure 1B:
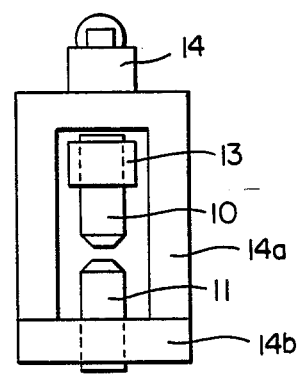

The section 14a which runs vertically off the upper connection rail 14 has the geometrical form of a gate (portal) or annulus envelops and/or passes around and by the lower connection rail on both sides, as is shown in FIG. 1b. In that way, the upper electrode 10 is held on the lower connection rail 13, and the lower electrode 11 is held on the upper connection rail 14, so that the connection rails 13 and 14 do not touch and do not interfere with one another in either an electrical or mechanical sense. The mountings for the rails are conventional and obvious to those skilled in the art. The mountings allow the rails to move slightly vertically apart and may comprise any known carriage or guide slide. Therefore, the connector rails 13 and 14 are supported by means of a mounting, not shown, in such a way that they may be displaced in relation to one another, so that the upper electrode and the lower electrode, 10 and 11, respectively, may be moved toward one another, i.e. in the closing direction, or apart, i.e. in the opening direction. The electrodes 10 and 11, are subject, by means of a conventional elastically resilient means, e.g. a spring, 40 to an electrode force and/or an initial stressing force F that urges the electrodes 10 and 11 in the closing direction.

For the performance of the welding process, workpieces (not shown) are placed between the upper electrode 10 and the lower electrode 11. Due to the electrode biasing force, the workpieces are placed in contact with the electrodes 10 and 11 and positioned as desired. When the workpieces are sensitive to pressure, it is possible to choose a very small electrode force F, since it is used largely to position the workpieces and maintain them in contact with the electrodes 10 and 11, prior to the actual welding process.

When the workpieces or components to be welded are positioned exactly, a voltage is applied via cables 15, 16 between the upper electrode 10 and the lower electrode 11, and a current of suitable intensity will flow. The current will flow, e.g. from the connecting cable 15 into the connecting cable 16, by way of the lower connector rail 13 and the upper electrode 10, through the components (not shown) to be welded, and by way of the lower electrode 11, the vertical section 14a and the upper connector rail 14. Depending on the connection of the connecting cables 15 and 16, the current may also flow in the opposite direction. In both cases, the current flows through the upper and lower connector rails in different directions. In the case of the direction of flow, as described above, the flow moves from right to left in the lower connector rail 13, and from left to right in the upper connector rail 14 as viewed in FIG. 1a. Accordingly, the connector rails 13 and 14 are conductors through which an anti-parallel flow takes place, and which generate electric fields. The magnetic lines of force are shown in FIG. 1a, by way of an example. The connector rails 13 and 14 due to the generated fields are mutually repellent, with an electro-magnetic force of $F_{e1}$; the sense of this force is shown in FIG. 1a. The repelling electro-magnetic force $F_{e1}$ has the effect of urging the electrodes 10, 11 in the same direction as the electrode force F and brings about a relative movement of the upper electrode 10 and the lower electrode 11, in the closing direction, so that a follow-up of the electrodes an/or a constant contact of the electrodes with the workpieces is ensured. For that reason, immediately prior to the welding process, i.e. before a current flows, it is largely only the electrode force F that acts on the electrodes and the components to be welded. During the welding process, i.e. while a current is flowing, the electro-magnetic force $F_{e1}$ which has the same direction as the electrode force F, acting on electrodes and components.

When components of highly conductive materials, e.g. small contact plates of silver, are welded, it is possible by means of the application of relatively small electrode force F prior to the welding process, to securely position the components to be welded, e.g. in mutual point contact, without any damage to the components.

During the welding process, the additionally acting electro-magnetic force $F_{e1}$ ensures the contact of the electrodes with the components to be welded.

Figure 2A:
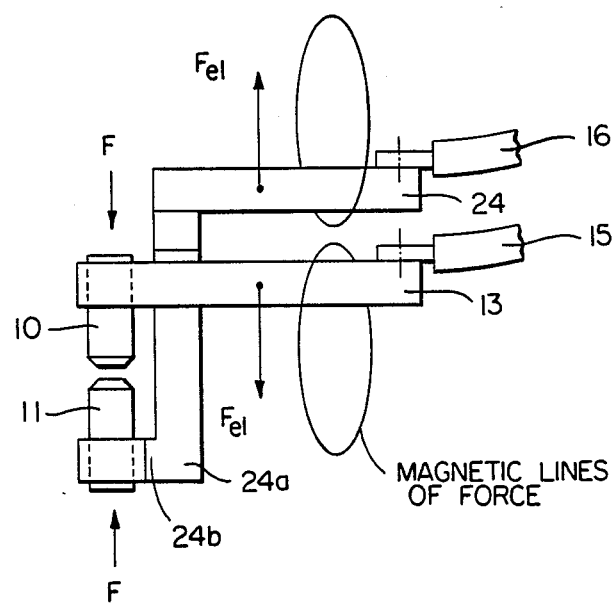
FIG. 2a shows in a lateral view, the design and arrangement of the connector rails in accordance with a second embodiment of the invention.
Figure 2B:
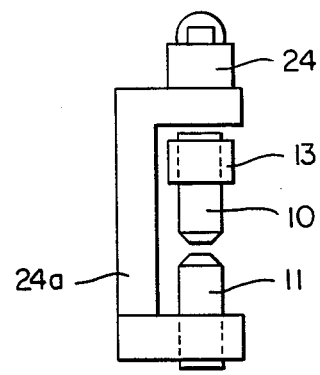

In FIGS. 2a and 2b, another embodiment of the invention is shown. The basic design and the mode of action of this embodiment are the same as that of the first embodiment in accordance with FIGS. 1a and 1b. Identical members which are used in both embodiments, are referred to by the same reference numbers. As may be seen in FIGS. 2a and 2b, an upper connector rail 24 consists of a straight horizontal bar having a vertical section 24a connected at one end. A flange-like projection 24b extends at a right angle from the bottom of section 24a. The section 24a, which follows a vertical course, off the upper connector rail is designed in the form of a c-shaped bracket that embraces or encloses the lower connector rail 13 on one side to perform the mechanical transforming action. In that way, the required space for the vertical section 24a is reduced considerably when compared to the vertical annular section 14a. Many other geometries or designs are possible for the connection, mechanically and electrically, of the upper connector rail 14, with the lower electrode 11 and of the lower connector rail 13 with the upper electrode 10. Of course, it is possible also to reverse the design and make the upper connector rail 14 a bar and to connect the lower connector rail 13 with the upper electrode 10 via a geometry (portal, c-shaped etc.) that bypasses up and around upper rail 14.

Figure 3:
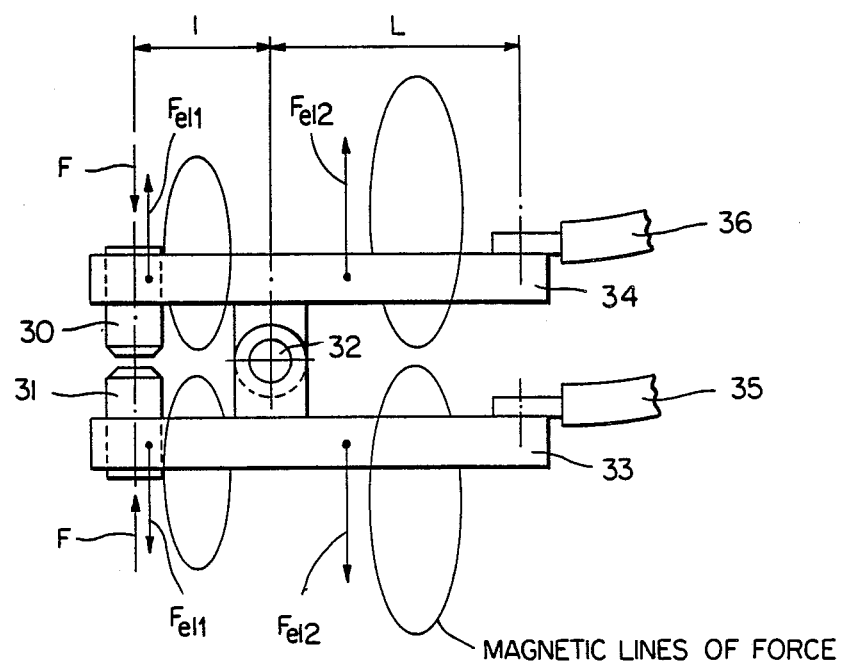
FIG. 3 shows in a lateral view, the design and arrangement of the connector rails in accordance with a third embodiment of the invention.

Apparatus for resistance welding, as shown in FIG. 3, is an additional embodiment of the invention and consists of an upper connector rail 34, to which a connecting cable 36 is electrically connected at one end and an upper electrode 30 is electrically connected at the other end, and a lower connector rail 33, to which a connecting cable 35 is electrically connected at one end and a lower electrode 31 is electrically connected at its other end. The upper electrode 30 and the lower electrode 31 face one another. The upper connector rail 34 and the lower connecting rail 33 are mounted one on top of the other and are substantially parallel and spaced apart. The upper connector rail 34 and the lower connector rail 33 are connected together, in an intermediate position shifted from the centers of the connector rails in the direction of the electrodes, by means of an electrically insulated joint 32, in such a way that they may be rotated in relation to one another while preserving their electrical isolation. Each connector rail 33 and/or 34, defines a first lever arm that has a length of 1 and is located between the point of rotation of the insulated joint 32 and the center of the pertinent electrode, 30 or 31, respectively, and a second lever arm that has a length of L and is located between the point of rotation of the insulated joint 32 and the contact point of the pertinent connecting cable 35 and/or 36. In accordance with FIG. 3, the length L of the second lever arm exceeds and is longer than the length 1 of the first lever arm. By means of an elastic member (not shown), e.g. of a spring, the electrodes 30 and 31 are subject to an electrode force an/or an initial stressing force F, that urges the electrodes 30 and 31 in a closing direction.

When workpieces are interposed between electrodes 30 and 31 during the performance of the welding process, for a predetermined period of time, a current of appropriate intensity will flow. Accordingly, the connector rails 33 and 34 are conductors through which the current flows in anti-parallel directions, and which generate an electro-magnetic field. The magnetic lines of force are shown in FIG. 3, by way of an example. The connector rails 32 and 34 repel one another with an electro-magnetic force of $F_{e11}$ over lever 1 and $F_{l2}$ over lever L which generate moments of rotation with contrasting action in relation to the point of rotation. Since the second lever arm is longer that the first lever arm, the electro-magnetic force $F_{e12}$ exceeds the electro-magnetic force $F_{e11}$. Accordingly, there remains a resulting moment of rotation that urges the upper an lower electrodes in the closing direction. Because of the current required by the welding process, the force in the direction of the electrode force F is increased accordingly. Prior to the welding process, i.e. before the current is applied, solely the electrode force F acts on the electrodes and/or the components to be welded, so that it is possible, by means of selecting a small electrode force F, to position securely sensitive components, without damaging them. During the welding process, the force that, due to the resulting moment of rotation, acts additionally on the electrodes, ensures the constant contact of the electrodes with the components to be welded, as well as a reliable follow-up of the electrodes.

To prevent any mutual canting of the electrodes 30 and 31 due to the opposite rotation of the upper and lower connector rails 33 and 34, the electrodes 30 and 31, may be pivotally mounted on the connector rails 30 and 31, respectively, in such a way that they may be rotated to compensate for the arcuate movement of the rails 33, 34. The electrodes may be guided by means of an insulated guidance arrangement (not shown) e.g. a slide or slot during their vertical movement, in such a way that its upper electrode and the lower electrode 30 and 31, respectively, are coaxially aligned and lying against the components to be welded, at all times.

The magnitude of the electro-magnetic force depends on many parameters, e.g. on the distance apart of the connecting rails, on their material, on the intensity of the current, and on the length of the connector rails. To be able to set the electro-magnetic force without any far-reaching structural measure, it is possible to provide, in the first and second embodiments, e.g. a device by means of which the distance of the connector rails may be modified, without any change of the distance of the electrodes. In the case of the third embodiment in accordance with FIG. 3, it is possible, e.g. to modify the lengths of the lever arms by making it possible to move the center of rotation and/or the insulated joint along the connector rail by the use of slotted plates. In that way, it is possible also to set the electro-magnetic force, in such a way that the resulting moment is equal to zero or, if it should be required in any isolated cases, that the resulting moment counteracts the electrode force F.

Unlike the embodiments described above, the apart movement of the electrodes may also be converted into their movement toward one another, in a different way. E.g., it is possible to interpose a gear unit, so as to achieve, when needed, a certain step-up or step-down ratio. The connector rails may be mounted so that they can be rotated in relation to one another, rather than being capable of parallel movement, by being hinged on the side provided with connecting cables with a fixed casing part. In that case, it is advantageous to prevent any mutual canting of the electrodes by means of a guiding mechanism as described above. Furthermore, the connector rails may be fixed on the casing part, so that a mutual movement of the connector rails takes place by way of their elastic deformation due to the electro-magnetic force. Since the magnitude of the electro-magnetic force depends on the distance of the connector rails, it is possible to achieve, by way of the shaping of the connector lines, the desired flow of electro-magnetic force during the period of time of the start-up period, until the electro-magnetic force has adjusted itself to a certain predetermined level.

In apparatus for resistance welding according to the invention, two electrodes that face one another, may be moved, by a force acting upon them, toward one another, and each of which is held by electrode supporters through which a current flows, an electro-magnetic force is active between the electrode supporters due to the welding current. In accordance with the invention, the electro-magnetic force is used to increase the electrode force, by converting the movement of the electrodes away from one another due to the electro-magnetic force into a movement of the electrodes toward one another. Since the electro-magnetic force acts only when the welding current flows, no excessive electrode force will be applied prior to welding that may damage sensitive components that are to be welded. Also, a follow-up of the electrodes is ensured during the welding process to secure contact with the components to be welded.

What is claimed:

1. In an electric welding apparatus having opposing electrodes spaced from each other, a pair of relatively movable supports, resilient means for biasing said electrodes toward each other and current supply means connected to the supports for conducting welding current therethrough to the electrodes, the improvement residing in said electrodes (10, 11) being mounted in fixed relation to the supports (13, 14, 24), said welding current conducted through the supports electromagnetically inducing movement thereof away from each other and means (14a, 24a) for mechanically transforming said movement of the supports away from each other into movement of the electrodes toward each other to augment said biasing of the electrodes toward each other and thereby maintain the electrodes in continuous workpiece contact.

2. Apparatus in accordance with claim 1, in which the electrode support comprise connection rails extending substantially in parallel spaced relation and wherein the apparatus includes means connecting the electrodes to the respective rails for movement of the electrodes toward one another in response to movement of the rails away from one another under the influence of said electromagnetic force.

3. Apparatus in accordance with claim 2, wherein the electrodes are mounted in vertical axial alignment, the rails being vertically spaced by the mechanical transforming means.

4. Apparatus in accordance with claim 3, wherein one of the connection rails is rectilinear, the mechanical transforming means including a gate section connected to the other of the connection rails in surrounding relation to said one of the rails.

5. Apparatus in accordance with claim 3, wherein one of the connection rails is rectilinear, the mechanical transforming means including a C-shaped section connected to the other of the rails in enclosing relation to said one of the rails.

6. The improvement as defined in claim 1 wherein said supports are rigid rails extending in substantially parallel spaced relation to each other, one of said electrodes being fixedly mounted on one of the rigid rails and the other of the electrodes being mounted by the mechanical transforming means in laterally spaced relation to said one of the rigid rails directionally opposite from said other of the rigid rails.

* * * * *